(12) United States Patent
Panda

(10) Patent No.: US 6,904,560 B1
(45) Date of Patent: Jun. 7, 2005

(54) IDENTIFYING KEY IMAGES IN A DOCUMENT IN CORRESPONDENCE TO DOCUMENT TEXT

(75) Inventor: Chinmoy Panda, Orissa (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/535,441

(22) Filed: Mar. 23, 2000

(51) Int. Cl.⁷ .............................................. G06F 17/21
(52) U.S. Cl. ..................................................... 715/500
(58) Field of Search .......................... 715/501.1; 707/3, 707/4, 104.1

(56) References Cited

U.S. PATENT DOCUMENTS

| | | | | |
|---|---|---|---|---|
| 5,404,435 A | * | 4/1995 | Rosenbaum | 715/515 |
| 5,751,286 A | * | 5/1998 | Barber et al. | 345/835 |
| 5,982,369 A | * | 11/1999 | Sciammarella et al. | 345/835 |
| 6,021,412 A | * | 2/2000 | Ho et al. | 707/104.1 |
| 6,247,009 B1 | * | 6/2001 | Shiiyama et al. | 707/3 |
| 6,397,213 B1 | * | 5/2002 | Cullen et al. | 707/5 |
| 6,480,837 B1 | * | 11/2002 | Dutta | 707/3 |
| 6,526,170 B1 | * | 2/2003 | Matsumoto | 382/187 |
| 6,526,400 B1 | * | 2/2003 | Takata et al. | 707/3 |

* cited by examiner

Primary Examiner—Joseph Feild
Assistant Examiner—Peter J. Smith
(74) Attorney, Agent, or Firm—Fish & Richardson P.C.

(57) ABSTRACT

A computer-implemented method and system for identifying key images in a document is provided. The operations used include extracting one or more document keywords from the document considered important in describing the document, collecting one or more images associated with the document including information describing each image, generating a proximity factor for each image collected from the document and each document keyword that reflects the degree of correlation between the image and the document keyword, and determining the importance of each image according to an image metric that combines the proximity factors for each document keyword and image pair. In addition, the operations may also include ordering the document keywords according to an ordering criterion and weighting the proximity factor associated with each document keyword and image pair based on the order of the document keyword.

26 Claims, 4 Drawing Sheets

IDENTIFYING KEY IMAGES IN A DOCUMENT IN CORRESPONDENCE TO DOCUMENT TEXT

BACKGROUND

This invention generally relates to the representation of image information in a document.

Traditional documents often use images to compliment or accompany the text information within the document. Images are typically included within the document to help the person reading the document better understand the text. Using conventional publishing software enables the author or editor of the document can manually determine what images are to be included in the document, how large the images should be and finally where to place them on a given page.

In some cases, it would be advantageous if the publishing software could automatically collect images from the document and organize them for different types of presentations. This would allow the images in different documents to be used for a variety of different purposes. For example, it would be useful if publishing software could select the key images from a document and present them to a user. Unfortunately, the current offering of publishing software is not designed to automatically analyze the images in a document and present them in different formats.

SUMMARY OF THE INVENTION

In one aspect of the present invention, a computer-implemented method identifies key images in a document, extracts one or more document keywords from the document considered important in describing the document, collects one or more images associated with the document including information describing each image, generates a proximity factor for each image collected from the document and each document keyword that reflects the degree of correlation between the image and the document keyword, and determines the importance of each image according to an image metric that combines the proximity factors for each document keyword and image pair.

Another aspect of the present invention also includes ordering the document keywords according to an ordering criterion and weighting the proximity factor associated with each document keyword and image pair based on the order of the document keyword.

Advantages in implementations of the invention include one or more of the following. The automatic selection of key images from a document can be used as a pictorial summary of a document. The images selected for the summary represent important images in the document and can therefore be helpful in understanding the document. In addition, identifying the key images in a document can also be used in image-based searching. The image-based search uses key images as seeds for searching just as key words are used as seeds in text-based searches. For example, the image-based searches may search for images similar to the key images selected from the document.

BRIEF DESCRIPTION OF THE DRAWINGS

The accompanying drawings, which are incorporated in and constitute a part of this specification, illustrate one implementation of the invention and, together with the description, serve to explain the advantages and principles of the invention.

DETAILED DESCRIPTION

Figure 1:
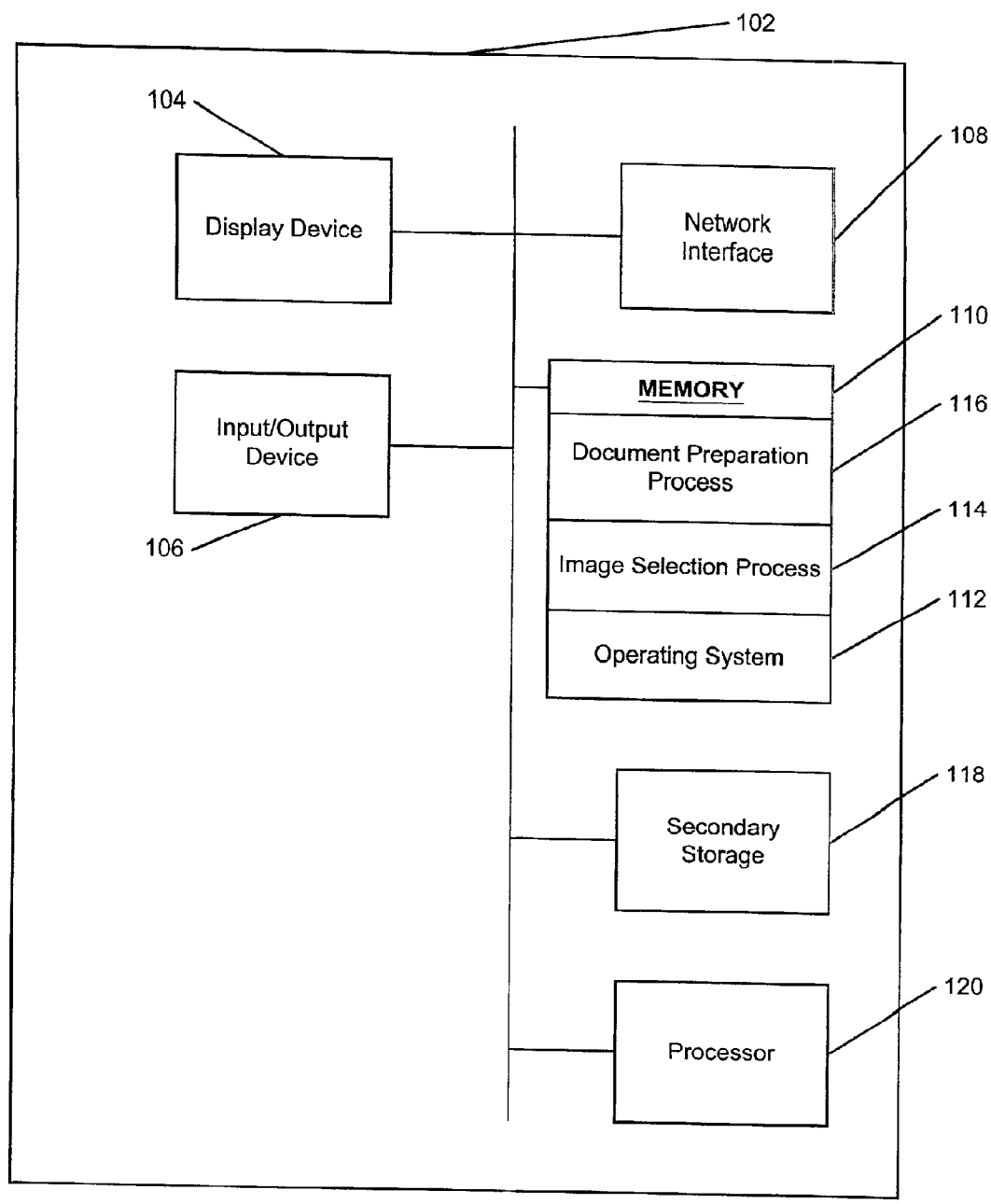
FIG. 1 is a block diagram representation of a computer system that uses one implementation of the invention to summarize a document with images.
Figure 2:
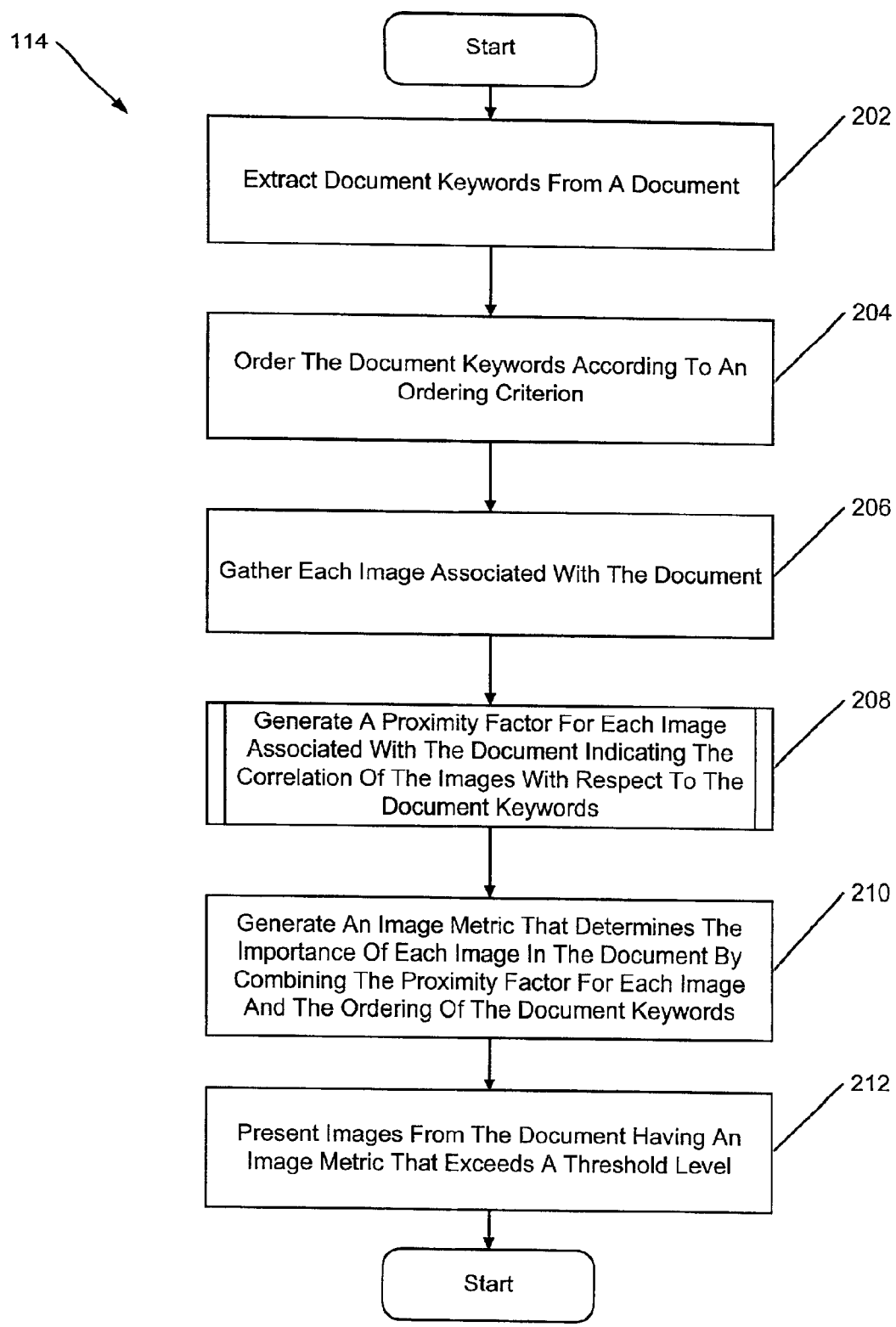
FIG. 2 is a flowchart of the operations used to generate a proximity factor for each image and select a set of images for the image summary based on the proximity factor.

FIG. 1 is a block diagram of a computer system for graphically displaying information in accordance with the present invention. This computer system 102 includes a display device 104, an input/output device 106, a network interface 108, a memory 110, a secondary storage 118, and a processor 120. When the system is operating, memory 110 includes an operating system 112, an image selection process 114, and a document preparation process 116. Image selection process 114 uses a proximity factor to identify key images in a document and an image metric to rank the image from the document. The proximity factor reflects the degree of correlation between an image and important text in the document identified as document keywords. The image metric incorporates the proximity factor and the document keywords to then identify the key images in the document. In one implementation, this image selection process 114 can be used in conjunction with document preparation process 116 to identify the key images in a document for use in a summary of the document. Further details on the proximity factor, the image metric, and the selection of key images are described in further detail below FIG. 2 illustrates the operations associated with image selection process 114. Initially, image selection process 114 extracts one or more document keywords from the document (step 202). In one implementation, the user specifies the set of words to be extracted from the document and identified as the document keywords. For example, the user can specify that image selection process 114 search a document for the words found in a dictionary. If the document to be processed concerns telecommunication and high-speed networking, the user may identify a set of words found in a technical dictionary having words related to telecommunications or high-speed networking.

Alternatively, the user may instruct image selection process 114 to identify the document keywords as those words occurring at a high frequency in the document. For example, the user may also specify that a word reoccur at a minimum threshold level in the document to be considered a document keyword. For example, the user can specify that a word appear in a document with a 1% minimum frequency to be considered a document keyword.

Image selection process 114 may also compare the meaning of a word with the subject matter of the document to identify document keywords. Words closely associated with the subject matter of a document would be considered better document keywords than other words in the document. For example, if the subject matter of a document is geography then words such as "terrain", "latitude", "longitude", or "equator" typically found in a geographic dictionary would be considered better document keywords.

Image selection process 114 then orders the document keyword according to an ordering criterion (step 204). The ordering criterion ranks the importance of the document keywords within the document and is later used to rank the images within the document. The user can either explicitly rank the document keywords or can instruct image selection process 114 to automatically rank the document keywords according to one or more criteria. For example, the user can specify that image selection process 114 automatically rank the more frequently occurring document keywords in the document with a higher importance than the less frequently occurring document keywords in the document. To become a document keyword, a word would have to appear in the predetermined list of words as well as appear a minimum number of times in the document text. Of course, document keywords can also be ranked using combinations of several ordering criteria. For example, document keywords can be ranked according to the frequency they appear in the document as well as their relationship to the subject matter of a document.

In addition to processing words in the document, image selection process 114 also includes collecting and processing each image associated with the document (step 206). The collecting step includes identifying the location of each image in the document and gathering the text directly associated with each image. The text associated with each image is called image text and can be physically adjacent to the image on a page or may be associated with each image over the Internet through a hypertext link. Image text can also include metatags or other information used to categorize an image, titles or other words used to describe the image, and words extracted directly from within the image using image processing techniques. For example, image text can be identified in a bit-mapped image by scanning the image, filtering the scanned image for text, and generating text information.

Image selection process 114 uses the document keywords and image information to generate a proximity factor to identify the key images in the document. The proximity factor reflects the correlation between each image collected from the document and each document keyword (step 208). In one implementation, image selection process 114 performs semantic or lexical comparisons between the image text associated with an image and the document keywords collected from the document to generate the proximity factor for an image. In an alternate implementation, image selection process 114 generates the proximity factor by measuring the actual physical distance between an image and each of the document keywords in the document. Both methods of generating a proximity factor are described in further detail below along with FIG. 3 and FIG. 4 respectively.

Image selection process 114 then selects the key images according to an image metric. The image metric combines the proximity factor between a document keyword and an image and weights it based on the ordering criterion used to order the document keywords (step 210). For example, one type of image metric value can be generated by multiplying the proximity factor with the corresponding rank of the document keyword. If the document keywords are not ranked, each proximity factors are multiplied by a factor of one. Image selection process 114 selects those images having an image metric value exceeding a threshold level and presents the images on a display device to the user (step 212)

Figure 3:
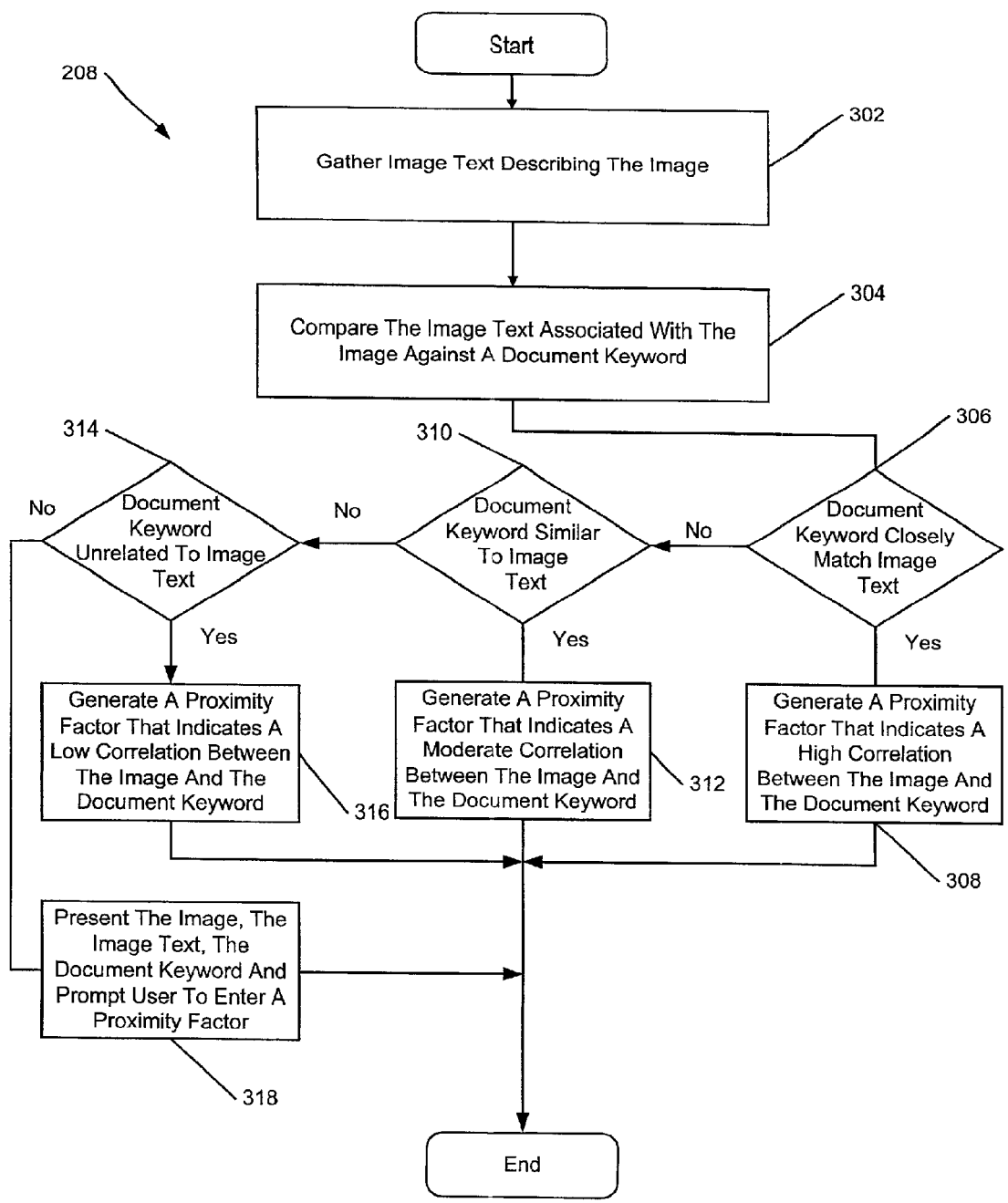
FIG. 3 is a flowchart of the operations that generate a proximity factor for an image by comparing the text associated with an image and the document keywords within the document.

FIG. 3 illustrates the operations used to compare the image text and the document keywords to generate a proximity factor for the image. Initially, image selection process 114 gathers image text from the text associated with each image (step 302). This image text includes all the text associated with an image. For example, image text can include all the words used in the title of an image as well as text generated from a bit-mapped version of the image using well-known image processing techniques.

Next, image selection process 114 compares each word of the image text with the document keywords (step 304). This comparison includes a lexical comparison of each word where each letter from each word of image text is compared with the corresponding letters in a document keyword. Alternatively, a semantic or phonetic comparison may be used to compare each word in the image text with each document keyword identified in the document. For example, a semantic comparison may compare descriptive information describing a word in the image text with the corresponding descriptive information for each document keyword. This descriptive information includes information such as the definition of a word. Unlike the semantic comparison, the phonetic comparison compares the sound of the image text with the sound of the document. Using well-known techniques, both the semantic and phonetic comparisons work in conjunction with databases, dictionaries, neural-networks, metadata and other technologies used to store, retrieve, and process the information.

Using one of the comparisons described above, if a document keyword closely matches the image text (step 306), then image selection process 114 generates a proximity factor indicating a high correlation between the particular image and the corresponding document keyword (step 308). If the document keyword is only similar to some of the image text (step 310), then image selection process 114 generates a proximity factor indicating a moderate correlation between the image and the document keyword (step 312). Finally, if the document keyword is determined to be unrelated to the image text (step 314), then proximity process 116 generates a proximity factor indicating a low correlation between the image and the document keyword (step 316). As an alternate to generating a proximity factor, image proximity process 116 can prompt the user to enter a proximity factor based on customized or user criteria (step 318). For example, image proximity process 116 can display a dialog box on a display device presenting the image, the image text, and the document keyword to a user and requesting the user to enter a proximity factor based on the user's judgment.

Figure 4:
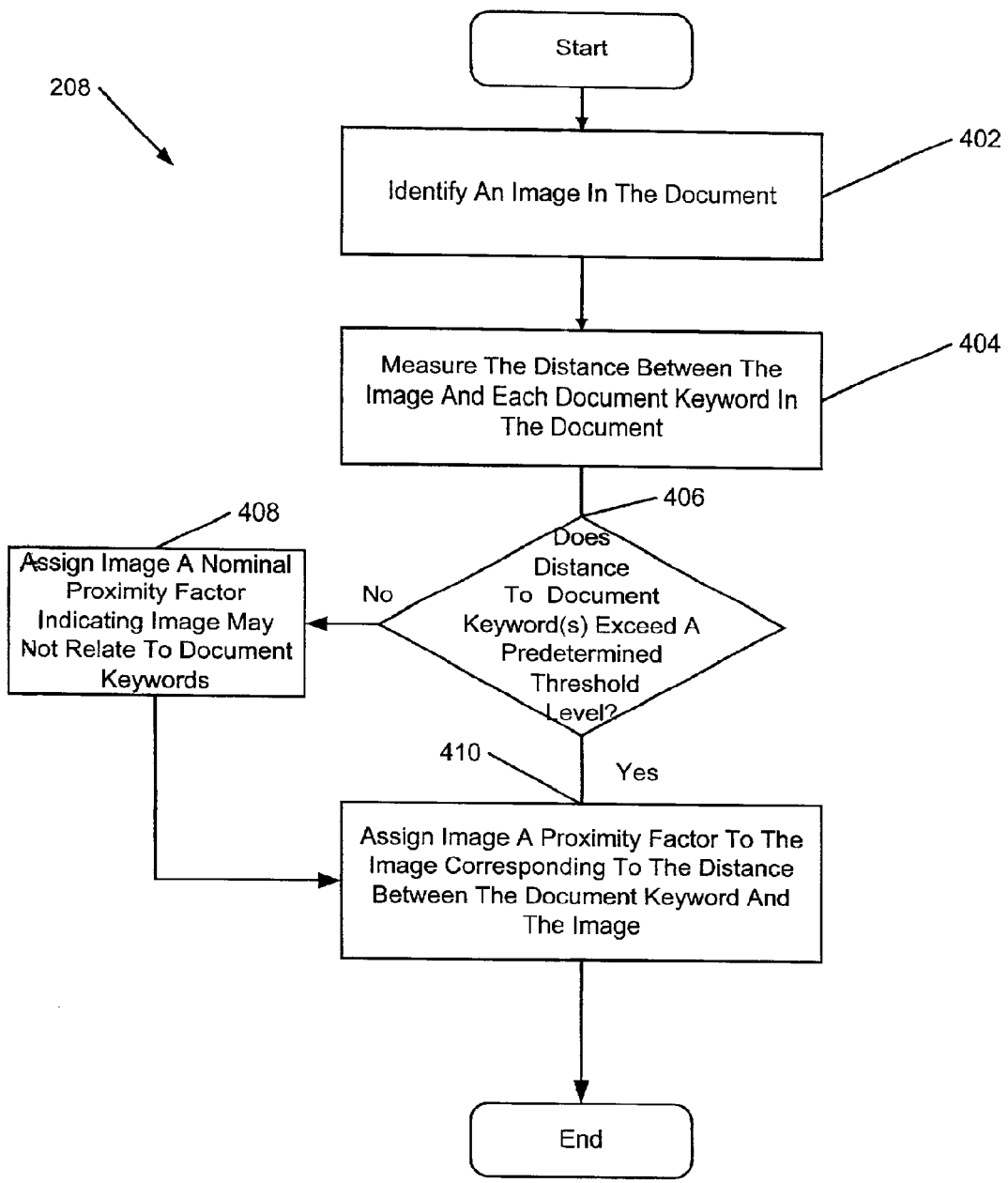
FIG. 4 is a flowchart of the operations used to generate a proximity factor for an image according to the distance between the image and the document keywords in the document.

FIG. 4 illustrates yet another implementation that generates the proximity factor by measuring the position of an image in a document in relationship to the position of the document keywords identified in the document. For example, an image having a document keyword in the image's title would likely be selected as a key image because of the close proximity between the document keyword and the image.

Initially, image selection process 114 identifies each image in the document and specifically notes the location of the image in the document relative to other text and images (step 402). The actual location of an image can be identified by a page number, by the number of single spaced lines from the start of the document, and by the number of characters offset from the start of the document as well as any combinations thereof.

Accordingly, image selection process 114 then measures the distance between the image and each document keyword in the document (step 404). These measurements include measuring the distance to document keywords located prior to the image as well as subsequent to the image in the document. If the distance from an image exceeds a threshold level (step 406), image selection process 114 assigns a nominal proximity factor to the image for the document keyword (step 408). The nominal proximity factor indicates that the image is unlikely to be associated with the particular document keyword. However, if the distance between the image and the document keywords is less than the threshold level, the proximity process 116 assigns a proximity factor to the image for the keyword corresponding to the distance (step 410). For example, the proximity factor can equal the reciprocal of the number of single-spaced lines between the center of the image and a document keyword. Once the proximity factors for each image are determined, each proximity factor is weighted according to the ranking of the document keywords.

This latter technique relies on spatial locality between an image and the keywords to identify the key images in the document. In addition, the proximity factor for an image can be generated using combinations of the above methods. For example, image selection process 114 may generate a proximity factor by measuring the distances between the image text and the document keywords as well as performing a letter-by-letter comparison between the image text and the various document keywords.

The methods and systems described above allow the automatic selection of images from a document. By automating the selection of key images from a document and presenting them on a computer display screen, people can quickly understand the meaning of document simply by looking at a few of the most important images in the document. This can be helpful for people doing research who need to access information quickly.

It can also be useful for people who have a slight visual impairment and can see pictures better than read text information. Accordingly, the systems and methods described above would help these people understand the contents of a document through a series of images.

Implementations of the present invention use digital electronic circuitry including various combinations of computer hardware, firmware, and software. Further, an apparatus can be implemented as a computer program product tangibly embodied in a machine-readable storage device for execution by a programmable processor; and method steps of the invention can be performed by a programmable processor executing a program of instructions to perform functions of the invention by operating on input data and generating output. The invention can also be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While specific embodiments have been described for purposes of illustration, various modifications may be made without departing from the spirit and scope of the invention. For example, performing lexical and phonetic comparisons were discussed for comparing image text and document text, however other methods for comparing text can also be used. Further, instead of selecting an image based upon the linear distance between an image and a document keyword, the distance can be measured by the radial physical distance from the centroid of an image to the centroid of the document keyword. Also, if the distance between an image and a document keyword exceeds a threshold distance, the proximity factor is assigned a 0 indicating the image is not relevant to the document. Accordingly, the invention is not limited to the above described embodiments, but instead is defined by the appended claims in light of their full scope of equivalents.

What is claimed is:

1. A computer-implemented method, comprising:

receiving a document comprising text and a plurality of images, each of the plurality of images having a location in the document;

extracting one or more document keywords from the document;

generating a proximity factor for each pair of one of the plurality of images and one of the document keywords, the proximity factor reflecting a degree of correlation between the image and the document keyword of the pair; and determining the importance of each of the plurality of images according to an image metric that combines the proximity factors for each document keyword and image pair.

2. The method of claim 1 further comprising presenting one or more of the plurality of images determined to be important on a display device.

3. The method of claim 1 further comprising:

ordering the document keywords according to an ordering criterion; and weighting the proximity factor associated with each document keyword and image pair based on the order of the document keyword.

4. The method of claim 3 wherein the frequency that each document keyword appears in the document determines the ordering criterion used to order the document keywords.

5. The method of claim 3 wherein the document has a subject matter and the ordering criterion orders the document keywords according to their relationship with the subject matter of the document.

6. The method of claim 1 further comprising identifying image text associated with each image of the plurality of images.

7. The method of claim 6 wherein identifying image text comprises:

scanning a bit-mapped representation of the image for text information; and converting the bit-mapped representation of the text information into image text.

8. The method of claim 6 wherein identifying image text comprises:

searching metadata information associated with the image for text describing the image.

9. The method of claim 8 wherein the metadata information is compatible with hypertext markup language (HTML).

10. The method of claim 6 wherein generating the proximity factor for an image and a document keyword of a document keyword and image pair further comprises lexically analyzing the image text associated with the image and the document keyword to determine the degree of correlation between the image and the document keyword.

11. The method of claim 6 wherein generating the proximity factor for an image and a document keyword of a document keyword and image pair further comprises performing a phonetic comparison between the image text associated with the image and the document keyword to determine the degree of correlation between the image and the document keyword.

12. The method of claim 1 wherein generating the proximity factor for an image and a document keyword of a document keyword and image pair further comprises:

identifying the location of the image in the document;

measuring the distance in the document between the image and the document keyword; and determining the correlation between the document keyword and the image according to the distance between the document keyword and the image.

13. An apparatus comprising:

means for receiving a document comprising text and a plurality of images, each of the plurality of images having a location in the document;

means for extracting one or more document keywords from the document;

means for generating a proximity factor for each pair of one of the plurality of images and one of the document keywords, the proximity factor reflecting a degree of correlation between the image and the document keyword of the pair; and means for determining the importance of each of the plurality of images according to an image metric that combines the proximity factors for each document keyword and image pair.

14. The apparatus of claim 13, further comprising:

means for ordering the document keywords according to an ordering criterion; and means for weighting the proximity factor associated with each document keyword and image pair based on the order of the document keyword.

15. A computer program product, tangibly embodied in a machine-readable storage device, the product comprising instructions operable to cause a computer to:

receive a document comprising text and a plurality of images, each of the plurality of images having a location in the document;

extract one or more document keywords from the document;

generate a proximity factor for each pair of one of the plurality of images and one of the document keywords, the proximity factor reflecting a degree of correlation between the image and the document keyword of the pair; and determine the importance of each of the plurality of images according to an image metric that combines the proximity factors for each document keyword and image pair.

16. The product of claim 15 further comprising instructions to:

present one or more of the plurality of images determined to be important on a display device.

17. The product of claim 15 further comprising instruction to:

order the document keywords according to an ordering criterion; and weigh the proximity factor associated with each document keyword and image pair based on the order of the document keyword.

18. The product of claim 17 wherein the frequency that each document keyword appears in the document determines the ordering criterion used to order the document keywords.

19. The product of claim 17 wherein the document has a subject matter and the ordering criterion orders the document keywords according to their relationship with the subject matter of the document.

20. The product of claim 15 further comprising instructions to identify image text associated with each image of the plurality of images.

21. The product of claim 20 wherein the instructions to identify image text comprise instructions to:

scan a bit-mapped representation of the image for text information; and convert the bit-mapped representation of the text information into image text.

22. The product of claim 20 wherein the instructions to identify image text comprise instructions to:

search metadata information associated with the image for text describing the image.

23. The product of claim 22 wherein the metadata information is compatible with hypertext markup language (HTML).

24. The product of claim 20 wherein the instructions to generate the proximity factor for an image and a document keyword of a document keyword and image pair further comprise instructions to lexically analyze the image text associated with the image and the document keyword to determine the degree of correlation between the image and the document keyword.

25. The product of claim 20 wherein the instructions to generate the proximity factor for an image and a document keyword of a document keyword and image pair further comprise instructions to perform a phonetic comparison between the image text associated with the image and the document keyword to determine the degree of correlation between the image and the document keyword.

26. The product of claim 15 wherein the instructions to generate the proximity factor for an image and a document keyword of a document keyword and image pair further comprise instructions to:

identify the location of the image in the document;

measure the distance between the image in the document and the document keyword; and determine the correlation between the document keyword and the image according to the distance between the document keyword and the image.

\* \* \* \* \*